US012387153B2

(12) United States Patent
Xu et al.

(10) Patent No.: US 12,387,153 B2
(45) Date of Patent: Aug. 12, 2025

(54) USER INTERFACE FOR PRESENTING RANKED SURGE PRICING OPPORTUNITIES FOR PICKERS IN AN ONLINE CONCIERGE SYSTEM

(71) Applicant: Maplebear Inc., San Francisco, CA (US)

(72) Inventors: Youdan Xu, Burlingame, CA (US); Matthew Donghyun Kim, Seattle, WA (US); Michael Chen, San Francisco, CA (US); Marina Tanasyuk, San Francisco, CA (US); Caleb Grisell, Los Angeles, CA (US); Adrian Mclean, Petaluma, CA (US); Ajay Pankaj Sampat, San Francisco, CA (US); Yuan Gao, San Mateo, CA (US)

(73) Assignee: Maplebear Inc., San Francisco, CA (US)

( * ) Notice: Subject to any disclaimer, the term of this patent is extended or adjusted under 35 U.S.C. 154(b) by 137 days.

(21) Appl. No.: 18/113,566

(22) Filed: Feb. 23, 2023

(65) Prior Publication Data

US 2024/0289731 A1   Aug. 29, 2024

(51) Int. Cl.
*G06Q 10/0631* (2023.01)
(52) U.S. Cl.
CPC ............... *G06Q 10/0631* (2013.01)
(58) Field of Classification Search
CPC .................................. G06Q 10/0631
USPC ........................................ 705/7.21
See application file for complete search history.

(56) References Cited

U.S. PATENT DOCUMENTS 11,341,554 B1 *   5/2022   Sturm ................ G06Q 30/0235

FOREIGN PATENT DOCUMENTS

WO    WO-2014017982 A1 *   1/2014   ............. G06Q 10/06

OTHER PUBLICATIONS

Servicenow, Advanced Work Assignment (AWA) FAQs, Aug. 3, 2022, https://www.servicenow.com/community/agent-chat-routing-and-sidebar/advanced-work-assignment-awa-faqs/ta-p/2306792, p. 1-3, 17.*
Dean, Microsoft Outlook Calendar: My Favorite Views, Hacks, Tips & Tricks—for Outlook Local Client, Feb. 15, 2021, https://www.youtube.com/watch?v=EF5WEALORvc, p. 1-5.*

(Continued)

*Primary Examiner* — Mehmet Yesildag
(74) *Attorney, Agent, or Firm* — Fenwick & West LLP

(57) ABSTRACT

An online concierge system schedules pickers (shoppers) to fulfill orders from users. During periods of peak demand, the system increases compensation to shoppers to encourage more to participate, thereby reducing missed orders. The system determines an optimal multiplier to increase compensation based on predictive models of supply and demand and then applying an optimization algorithm to search different hyperparameters that affect how the models generate the multipliers. The system selects the optimal multipliers for different time periods and locations. The system may further present the multipliers being offered during future time periods and enable users to activate reminder alerts for select periods. The offers may be presented in a ranked list using a model trained to infer likelihoods of the user accepting participation and/or setting a reminder notification.

18 Claims, 8 Drawing Sheets

(56) References Cited

OTHER PUBLICATIONS

Instacart, Maximizing Your Access to Batches, Jun. 9, 2020, https://www.instacart.com/company/shopper-community/maximizing-your-access-to-batches/, p. 1-3.*

Hadi Jahanshahi, Aysun Bozanta, Mucahit Cevik, Eray Mert Kavuk, Ayşe Tosun, Sibel B. Sonuc, Bilgin Kosucu, Ayşe Başar, "A Deep Reinforcement Learning Approach for the Meal Delivery Problem", 2021, https://doi.org/10.48550/arXiv.2104.12000 (Year: 2021).*

* cited by examiner

USER INTERFACE FOR PRESENTING RANKED SURGE PRICING OPPORTUNITIES FOR PICKERS IN AN ONLINE CONCIERGE SYSTEM

BACKGROUND

In an online concierge system, customers may select items for ordering, procurement, and delivery from physical retailers or other warehouses. The online concierge system assigns orders to available shoppers that fulfill the orders for a fee. In such a system, the supply and demand for shoppers can vary significantly over different times of day, different days of the week, during holidays, or based on various other factors. To reduce disparities in supply and demand, the online concierge system may employ a surge pricing model in which the wages offered to shoppers dynamically adapt under various conditions. However, there is a tradeoff between the additional costs associated with surge pricing versus the benefit of encouraging more shoppers to fulfill orders during a given time period. Effective deployment of an optimal surge pricing model thus remains a challenge.

SUMMARY

In accordance with one or more aspects of the disclosure, an online concierge system utilizes a network of pickers (shoppers) to fulfill orders for items placed by customers in a client application. The online concierge system facilitates a surge pricing model that reduces variances in supply and demand while maintaining adherence to budget constraints. In an example process, the online concierge system obtains supply and demand metrics that forecast relative supply and demand for pickers in a series of future time periods. The online concierge system furthermore obtains cost metrics based on respective base wages for compensating the pickers in the series of future time periods. The online concierge system determines respective initial multipliers for applying to the respective base wages in the series of future time periods based on the supply and demand metrics and the cost metrics. The online concierge system then iteratively performs wage simulations associated with operation of the online concierge system over the series of future time periods and optimizes respective current multipliers applied to the respective base wages in the wage simulations. Here, the respective current multipliers are initialized using the respective initial multipliers, and the respective current multipliers are iteratively updated over the wage simulations to result in respective final multipliers when an optimization criterion is met. Upon meeting the optimization criterion, the online concierge system applies the respective final multipliers to the respective base wages for the series of future time periods to generate respective optimized wages for the series of future time periods. The online concierge system outputs, via a picker client application, an indication of the respective optimized wages for offering to the pickers during the series of future time periods.

In one or more embodiments, iteratively performing the wage simulations and optimizing the respective current multipliers comprises obtaining hyperparameters for training a candidate surge pricing model that infers the respective current multipliers for applying in the wage simulations, applying the candidate surge pricing model in the wage simulations to generate at least one operational metric, determining if the operational metric meets the optimization criterion, and responsive to the operational metric not meeting the optimization criterion, adjusting the one or more hyperparameters.

In one or more embodiments, applying the candidate surge pricing model comprises obtaining historical data relating to orders in the online concierge system, and applying the candidate surge pricing model to the historical data.

In one or more embodiments, the optimization criterion comprises achieving a deviation below a threshold deviation from a predefined budget. Here, the step of adjusting the one or more hyperparameters comprises applying an optimization process that seeks to iteratively reduce the deviation.

In one or more embodiments, determining the respective initial multipliers comprises applying a supply forecasting model to forecast a supply metric for the series of future time periods, applying a demand forecasting model to forecast a demand metric for the series of future time periods, and determining the supply and demand metric as a ratio of the supply metric and the demand metric.

In one or more embodiments, determining the respective initial multipliers comprises applying a linear function to the supply and demand metrics that, subject to budget constraints, results in larger initial multipliers during periods when demand exceeds supply and results in smaller initial multipliers during periods when supply exceeds demand.

In one or more embodiments, the respective final multipliers for the series of future time periods correspond to a limited geographic zone associated with the online concierge system.

In another aspect of the disclosure, the online concierge system intelligently presents surge pricing opportunities to prospective pickers. In an example process, the online concierge system obtains, for a series of future time periods, respective wage multipliers for offering to pickers. The online concierge system determines, for a user, a ranked list of time windows and the respective wage multipliers for the time windows associated with opportunities for the user to participate as a picker in the online concierge system. Here, determining the ranked list of time windows may comprise applying a machine learning model to user profile data for the user that is trained to infer relative likelihoods of the user accepting opportunities in the list of time windows. The online concierge system provides the ranked list of time windows to a picker client device for presenting in a user interface.

In one or more embodiments, the process further comprises receiving a selection of one or more time windows in the user interface of the picker client device indicating an acceptance of the one or more time windows, and making the user available for assignment to orders by the online concierge system during the one or more time windows.

In one or more embodiments, the user interface comprises a notification selection element for switching on or off a notification associated with a time window in the ranked list of time windows. Responsive to the notification selection element being activated for a selected time window, the online concierge system generates a notification to the picker client device at a predefined time in advance of the selected time window.

In one or more embodiments, the user interface comprises a set of visual indicators for each of the ranked list of time windows representing the relative wages for each of the ranked list of time windows.

In one or more embodiments, the machine learning model is trained according to a learning process that comprises obtaining historical data associated with picker participation of the user in the online concierge system including time windows where the user participated and wage multipliers being offered when the user participated, and applying a supervised learning algorithm to learn likelihoods of the user accepting participation opportunities based at least in part on the time window and the wage multiplier.

In one or more embodiments, the historical data further includes events associated with a population of users of the online concierge system and profile characteristics associated with the population of users.

In a further embodiment, the historical data further includes selections by the user to enable notifications in advance of one or more of the time windows.

In further aspects, a computer system includes one or more processors and a non-transitory computer-readable storage medium that stores instructions executable by the one or more processors for performing any of the methods described above.

DETAILED DESCRIPTION

Figure 1:
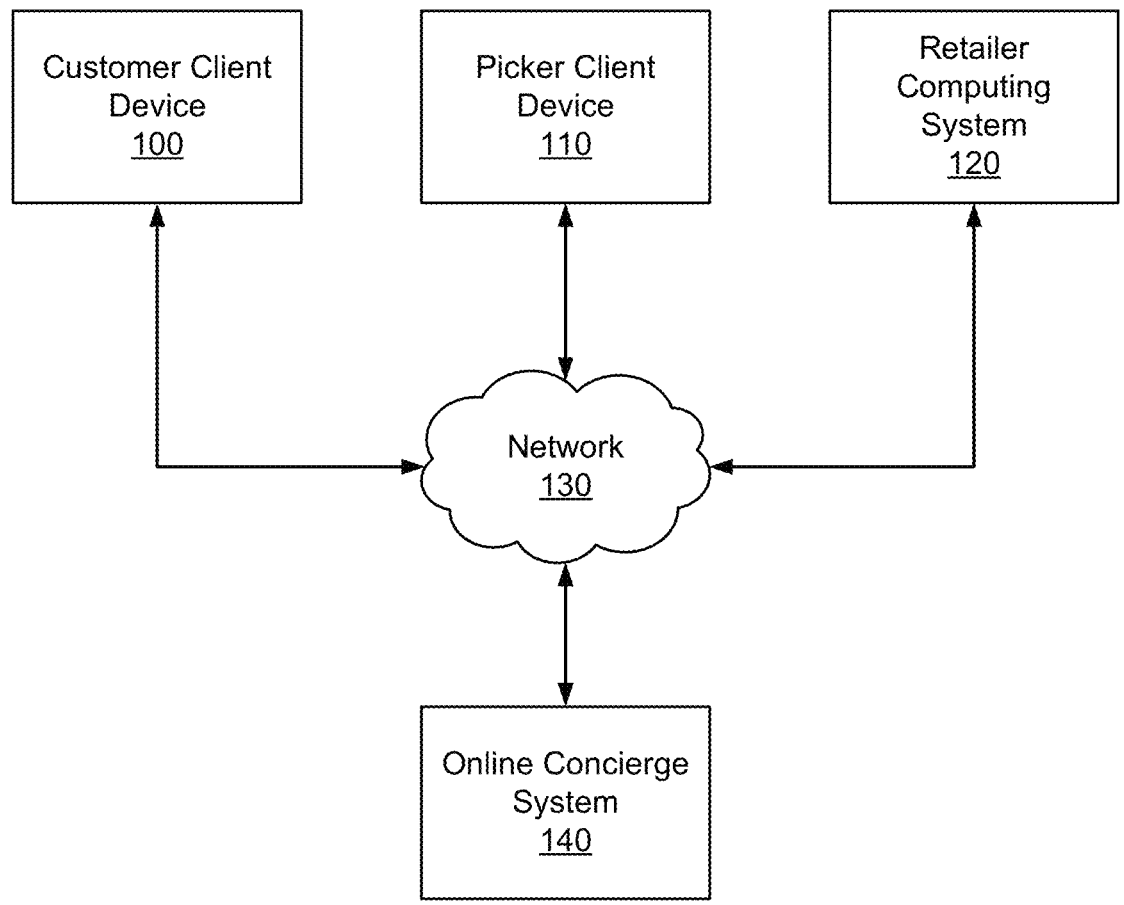
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a customer client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

As used herein, customers, pickers, and retailers may be generically referred to as "users" of the online concierge system 140. Additionally, while one customer client device 100, picker client device 110, and retailer computing system 120 are illustrated in FIG. 1, any number of customers, pickers, and retailers may interact with the online concierge system 140. As such, there may be more than one customer client device 100, picker client device 110, or retailer computing system 120.

The customer client device 100 is a client device through which a customer may interact with the picker client device 110, the retailer computing system 120, or the online concierge system 140. The customer client device 100 can be a personal or mobile computing device, such as a smartphone, a tablet, a laptop computer, or desktop computer. In some embodiments, the customer client device 100 executes a client application that uses an application programming interface (API) to communicate with the online concierge system 140.

A customer uses the customer client device 100 to place an order with the online concierge system 140. An order specifies a set of items to be delivered to the customer. An "item", as used herein, means a good or product that can be provided to the customer through the online concierge system 140. The order may include item identifiers (e.g., a stock keeping unit or a price look-up code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The customer client device 100 presents an ordering interface to the customer. The ordering interface is a user interface that the customer can use to place an order with the online concierge system 140. The ordering interface may be part of a client application operating on the customer client device 100. The ordering interface allows the customer to search for items that are available through the online concierge system 140 and the customer can select which items to add to a "shopping list." A "shopping list," as used herein, is a tentative set of items that the user has selected for an order but that has not yet been finalized for an order. The ordering interface allows a customer to update the shopping list, e.g., by changing the quantity of items, adding or removing items, or adding instructions for items that specify how the item should be collected.

The customer client device 100 may receive additional content from the online concierge system 140 to present to a customer. For example, the customer client device 100 may receive coupons, recipes, or item suggestions. The customer client device 100 may present the received additional content to the customer as the customer uses the customer client device 100 to place an order (e.g., as part of the ordering interface).

Additionally, the customer client device 100 includes a communication interface that allows the customer to communicate with a picker that is servicing the customer's order. This communication interface allows the user to input a text-based message to transmit to the picker client device 110 via the network 130. The picker client device 110 receives the message from the customer client device 100 and presents the message to the picker. The picker client device 110 also includes a communication interface that allows the picker to communicate with the customer. The picker client device 110 transmits a message provided by the picker to the customer client device 100 via the network 130. In some embodiments, messages sent between the customer client device 100 and the picker client device 110 are transmitted through the online concierge system 140. In addition to text messages, the communication interfaces of the customer client device 100 and the picker client device 110 may allow the customer and the picker to communicate through audio or video communications, such as a phone call, a voice-over-IP call, or a video call.

The picker client device 110 is a client device through which a picker may interact with the customer client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the customer's order to the picker in a collection interface. The collection interface is a user interface that provides information to the picker on which items to collect for a customer's order and the quantities of the items. In some embodiments, the collection interface provides multiple orders from multiple customers for the picker to service at the same time from the same retailer location. The collection interface further presents instructions that the customer may have included related to the collection of items in the order. Additionally, the collection interface may present a location of each item in the retailer location, and may even specify a sequence in which the picker should collect the items for improved efficiency in collecting items. In some embodiments, the picker client device 110 transmits to the online concierge system 140 or the customer client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a customer's order. For example, the picker client device 110 displays a delivery location from the order to the picker. The picker client device 110 also provides navigation instructions for the picker to travel from the retailer location to the delivery location. Where a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the customer client device 100 for display to the customer such that the customer can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a customer from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system may 120 provide item data indicating which items are available at a retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The customer client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as MPLS lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which customers can order items to be provided to them by a picker from a retailer. The online concierge system 140 receives orders from a customer client device 100 through the network 130. The online concierge system 140 selects a picker to service the customer's order and transmits the order to a picker client device 110 associated with the picker. The picker collects the ordered items from a retailer location and delivers the ordered items to the customer. The online concierge system 140 may charge a customer for the order and provides portions of the payment from the customer to the picker and the retailer.

As an example, the online concierge system 140 may allow a customer to order groceries from a grocery store retailer. The customer's order may specify which groceries they want delivered from the grocery store and the quantities of each of the groceries. The customer's client device 100 transmits the customer's order to the online concierge system 140 and the online concierge system 140 selects a picker to travel to the grocery store retailer location to collect the groceries ordered by the customer. Once the picker has collected the groceries ordered by the customer, the picker delivers the groceries to a location transmitted to the picker client device 110 by the online concierge system 140. The online concierge system 140 is described in further detail below with regards to FIG. 2.

Figure 2:
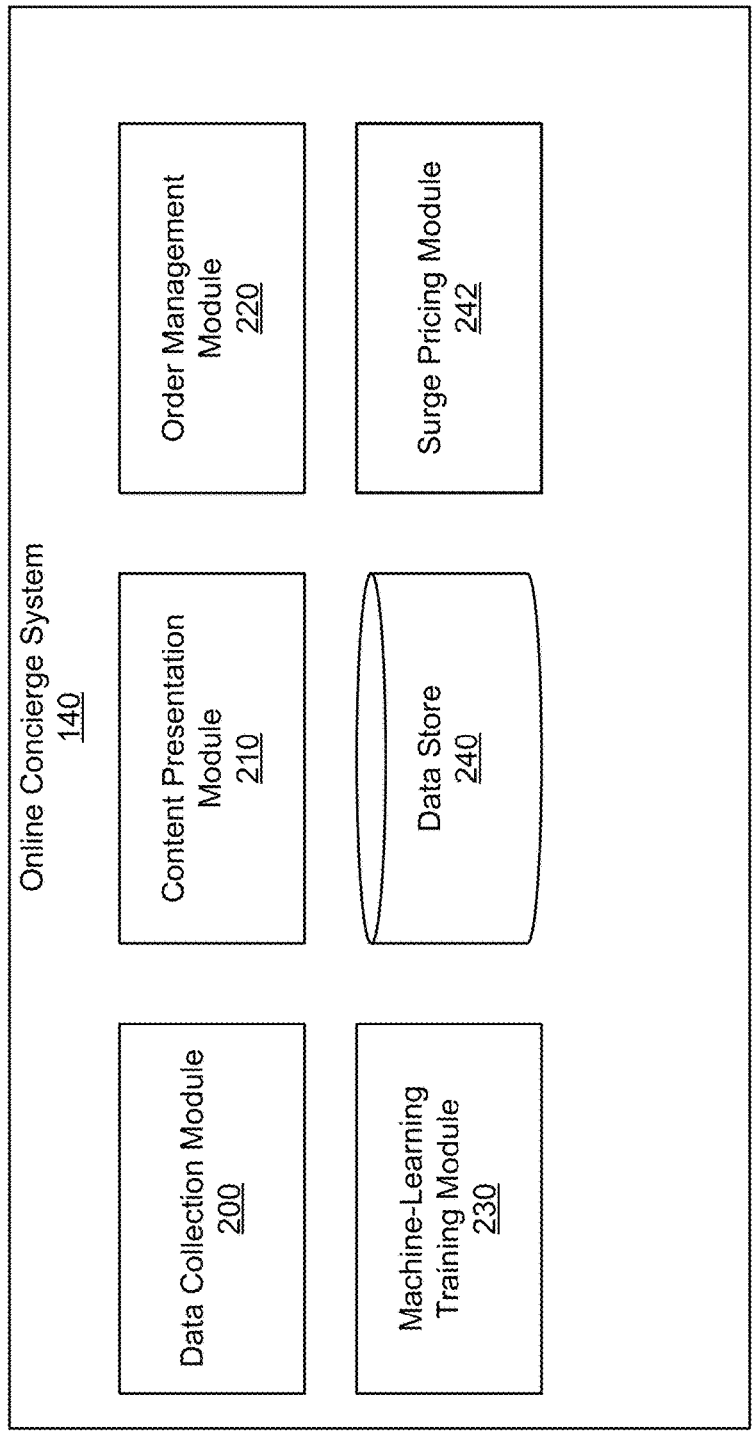
FIG. 2 illustrates an example system architecture for an online concierge system, in accordance with one or more embodiments.

FIG. 2 illustrates an example system architecture for an online concierge system 140, in accordance with some embodiments. The system architecture illustrated in FIG. 2 includes a data collection module 200, a content presentation module 210, an order management module 220, a machine learning training module 230, and a data store 240. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects customer data, which is information or data that describe characteristics of a customer. Customer data may include a customer's name, address, shopping preferences, favorite items, or stored payment instruments. The customer data also may include default settings established by the customer, such as a default retailer/retailer location, payment instrument, delivery location, or delivery timeframe. The data collection module 200 may collect the customer data from sensors on the customer client device 100 or based on the customer's interactions with the online concierge system 140.

The data collection module 200 also collects item data, which is information or data that identifies and describes items that are available at a retailer location. The item data may include item identifiers for items that are available and may include quantities of items associated with each item identifier. Additionally, item data may also include attributes of items such as the size, color, weight, stock keeping unit (SKU), or serial number for the item. The item data may further include purchasing rules associated with each item, if they exist. For example, age-restricted items such as alcohol and tobacco are flagged accordingly in the item data. Item data may also include information that is useful for predicting the availability of items in retailer locations. For example, for each item-retailer combination (a particular item at a particular warehouse), the item data may include a time that the item was last found, a time that the item was last not found (a picker looked for the item but could not find it), the rate at which the item is found, or the popularity of the item. The data collection module 200 may collect item data from a retailer computing system 120, a picker client device 110, or the customer client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the picker data for a picker may include the picker's name, the picker's location, how often the picker has services orders for the online concierge system 140, a customer rating for the picker, which retailers the picker has collected items at, or the picker's previous shopping history. Additionally, the picker data may include preferences expressed by the picker, such as their preferred retailers to collect items at, how far they are willing to travel to deliver items to a customer, how many items they are willing to collect at a time, timeframes within which the picker is willing to service orders, or payment information by which the picker is to be paid for servicing orders (e.g., a bank account). The data collection module 200 collects picker data from sensors of the picker client device 110 or from the picker's interactions with the online concierge system 140.

Additionally, the data collection module 200 collects order data, which is information or data that describes characteristics of an order. For example, order data may include item data for items that are included in the order, a delivery location for the order, a customer associated with the order, a retailer location from which the customer wants the ordered items collected, or a timeframe within which the customer wants the order delivered. Order data may further include information describing how the order was serviced, such as which picker serviced the order, when the order was delivered, or a rating that the customer gave the delivery of the order.

The content presentation module 210 selects content for presentation to a customer. For example, the content presentation module 210 selects which items to present to a customer while the customer is placing an order. The content presentation module 210 generates and transmits the ordering interface for the customer to order items. The content presentation module 210 populates the ordering interface with items that the customer may select for adding to their order. In some embodiments, the content presentation module 210 presents a catalog of all items that are available to the customer, which the customer can browse to select items to order. The content presentation module 210 also may identify items that the customer is most likely to order and present those items to the customer. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a customer. An item selection model is a machine learning model that is trained to score items for a customer based on item data for the items and customer data for the customer. For example, the item selection model may be trained to determine a likelihood that the customer will order the item. In some embodiments, the item selection model uses item embeddings describing items and customer embeddings describing customers to score items. These item embeddings and customer embeddings may be generated by separate machine learning models and may be stored in the data store 240.

In some embodiments, the content presentation module 210 scores items based on a search query received from the customer client device 100. A search query is text for a word or set of words that indicate items of interest to the customer. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a customer (e.g., by comparing a search query embedding to an item embedding).

In some embodiments, the content presentation module 210 scores items based on a predicted availability of an item. The content presentation module 210 may use an availability model to predict the availability of an item. An availability model is a machine learning model that is trained to predict the availability of an item at a retailer location. For example, the availability model may be trained to predict a likelihood that an item is available at a retailer location or may predict an estimated number of items that are available at a retailer location. The content presentation module 210 may weight the score for an item based on the predicted availability of the item. Alternatively, the content presentation module 210 may filter out items from presentation to a customer based on whether the predicted availability of the item exceeds a threshold.

The order management module 220 that manages orders for items from customers. The order management module 220 receives orders from a customer client device 100 and assigns the orders to pickers for service based on picker data. For example, the order management module 220 assigns an order to a picker based on the picker's location and the location of the retailer location from which the ordered items are to be collected. The order management module 220 may also assign an order to a picker based on how many items are in the order, a vehicle operated by the picker, the delivery location, the picker's preferences on how far to travel to deliver an order, the picker's ratings by customers, or how often a picker agrees to service an order.

In some embodiments, the order management module 220 determines when to assign an order to a picker based on a delivery timeframe requested by the customer with the order. The order management module 220 computes an estimated amount of time that it would take for a picker to collect the items for an order and deliver the ordered item to the delivery location for the order. The order management module 220 assigns the order to a picker at a time such that, if the picker immediately services the order, the picker is likely to deliver the order at a time within the timeframe. Thus, when the order management module 220 receives an order, the order management module 220 may delay in assigning the order to a picker if the timeframe is far enough in the future.

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the customer client device 100 that describe which items have been collected for the customer's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit to the picker client device 110 instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the customer with the location of the picker so that the customer can track the progress of their order. In some embodiments, the order management module 220 computes an estimated time of arrival for the picker at the delivery location and provides the estimated time of arrival to the customer.

In some embodiments, the order management module 220 facilitates communication between the customer client device 100 and the picker client device 110. As noted above, a customer may use a customer client device 100 to send a message to the picker client device 110. The order management module 220 receives the message from the customer client device 100 and transmits the message to the picker client device 110 for presentation to the picker. The picker may use the picker client device 110 to send a message to the customer client device 100 in a similar manner.

The order management module 220 coordinates payment by the customer for the order. The order management module 220 uses payment information provided by the customer (e.g., a credit card number or a bank account) to receive payment for the order. In some embodiments, the order management module 220 stores the payment information for use in subsequent orders by the customer. The order management module 220 computes a total cost for the order and charges the customer that cost. The order management module 220 may provide a portion of the total cost to the picker for servicing the order, and another portion of the total cost to the retailer.

The machine learning training module 230 trains machine learning models used by the online concierge system 140. The online concierge system 140 may use machine learning models to perform functionalities described herein. Example machine learning models include regression models, support vector machines, naïve bayes, decision trees, k nearest neighbors, random forest, boosting algorithms, k-means, and hierarchical clustering. The machine learning models may also include neural networks, such as perceptrons, multilayer perceptrons, convolutional neural networks, recurrent neural networks, sequence-to-sequence models, generative adversarial networks, or transformers.

Each machine learning model includes a set of parameters. A set of parameters for a machine learning model are parameters that the machine learning model uses to process an input. For example, a set of parameters for a linear regression model may include weights that are applied to each input variable in the linear combination that comprises the linear regression model. Similarly, the set of parameters for a neural network may include weights and biases that are applied at each neuron in the neural network. The machine learning training module 230 generates the set of parameters for a machine learning model by "training" the machine learning model. Once trained, the machine learning model uses the set of parameters to transform inputs into outputs.

The machine learning training module 230 trains a machine learning model based on a set of training examples. Each training example includes input data to which the machine learning model is applied to generate an output. For example, each training example may include customer data, picker data, item data, or order data. In some cases, the training examples also include a label which represents an expected output of the machine learning model. In these cases, the machine learning model is trained by comparing its output from input data of a training example to the label for the training example.

The machine learning training module 230 may apply an iterative process to train a machine learning model whereby the machine learning training module 230 trains the machine learning model on each of the set of training examples. To train a machine learning model based on a training example, the machine learning training module 230 applies the machine learning model to the input data in the training example to generate an output. The machine learning training module 230 scores the output from the machine learning model using a loss function. A loss function is a function that generates a score for the output of the machine learning model such that the score is higher when the machine learning model performs poorly and lower when the machine learning model performs well. In cases where the training example includes a label, the loss function is also based on the label for the training example. Some example loss functions include the mean square error function, the mean absolute error, hinge loss function, and the cross entropy loss function. The machine learning training module 230 updates the set of parameters for the machine learning model based on the score generated by the loss function. For example, the machine learning training module 230 may apply gradient descent to update the set of parameters.

The data store 240 stores data used by the online concierge system 140. For example, the data store 240 stores customer data, item data, order data, and picker data for use by the online concierge system 140. The data store 240 also stores trained machine learning models trained by the machine learning training module 230. For example, the data store 240 may store the set of parameters for a trained machine learning model on one or more non-transitory, computer-readable media. The data store 240 uses computer-readable media to store data, and may use databases to organize the stored data.

The surge pricing module 242 facilitates changes in compensation offered to pickers based on supply and demand or other dynamic factors. For example, the surge pricing module 242 may employ a pricing model that generally increases compensation (relative to baseline levels) to pickers during forecasted periods of peak demand to encourage more participation, and may decrease compensation to the baseline (or below baseline levels) during forecasted periods of relatively low demand. Furthermore, the surge pricing module 242 may operate within various budget constraints that constrain the overall budget available for picker compensation over predefined time periods. Thus, for example, an increase in compensation on one day may be offset by a reduction in cost on other days.

To facilitate dynamic pricing, the surge pricing module 242 may set respective multipliers for different time periods dependent on forecasted supply and demand, cost per picker, and/or other factors. The multipliers are applied to a base wage to generate a series of optimized wages that vary between time periods. These optimized wages may then be offered to pickers during the respective time periods for the purpose of encouraging participation levels to vary with forecasted variance in demand. In one or more embodiments, the surge pricing module 242 configures the multipliers in a manner that substantially maintains cost neutrality with respect to a predefined budget expectation. For example, the surge pricing structure may be designed to maintain an overall budget substantially the same as the budget warranted by a flat pricing structure based on the base wage level. An example embodiment of a surge pricing module 242 is described in further detail below with respect to FIGS. 3-4.

Figure 5:
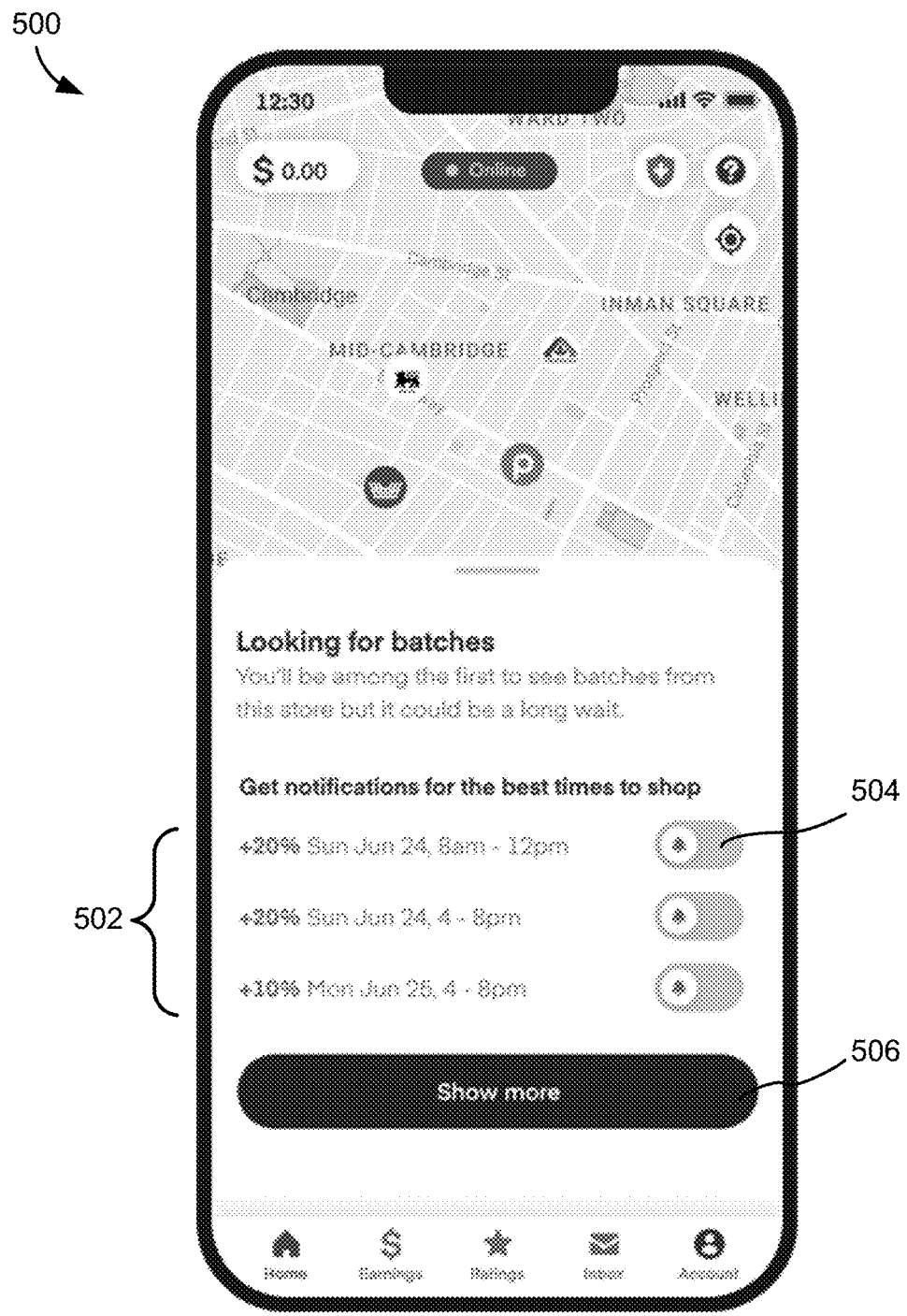
FIG. 5 is a first example embodiment of a user interface for presenting time windows and surge pricing opportunities for a user of the online concierge system.
Figure 6:
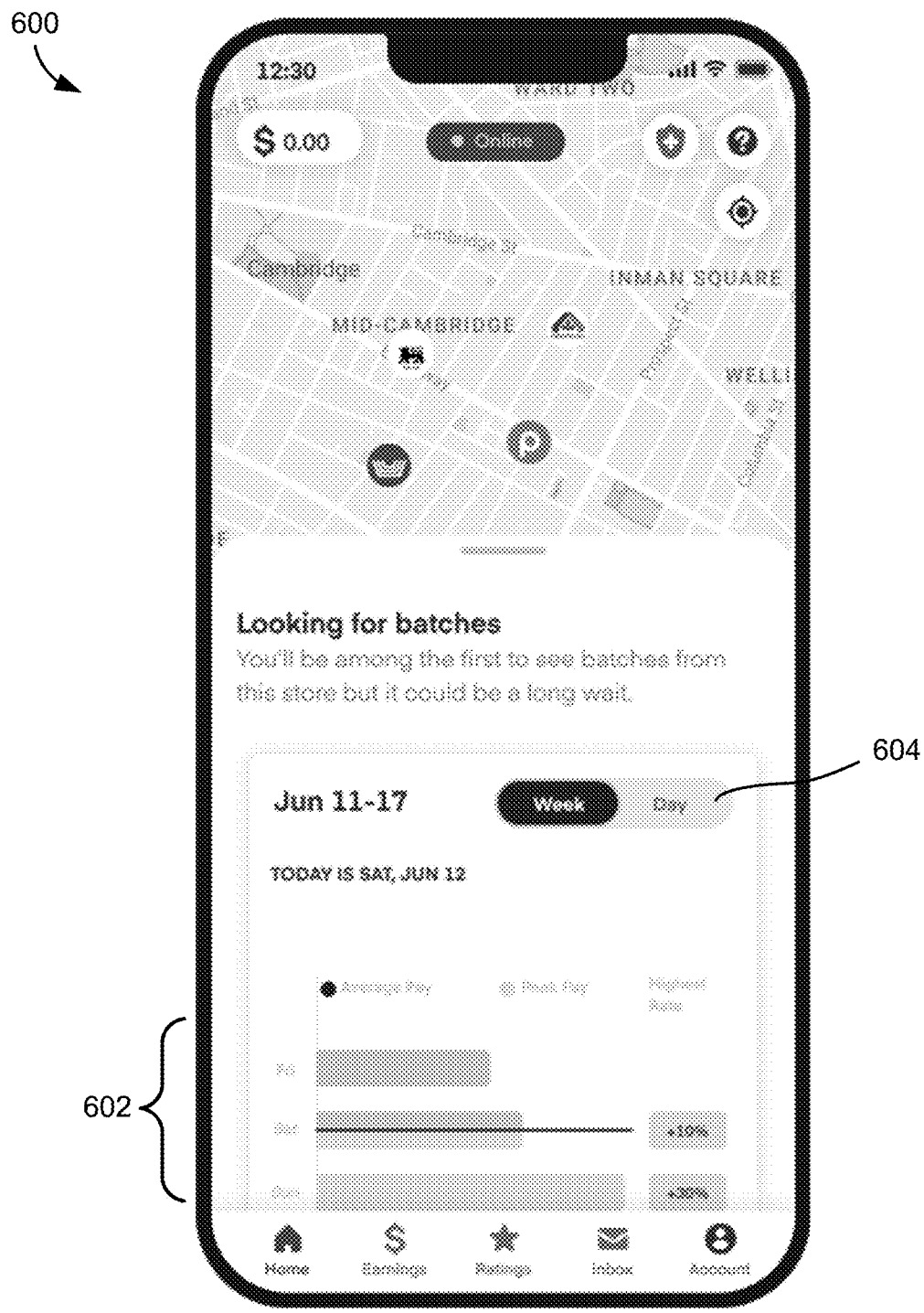
FIG. 6 is a second example embodiment of a user interface for presenting time windows and surge pricing opportunities for a user of the online concierge system.

The surge pricing module 242 may furthermore control a user interface for a picker client device 110 that presents picker opportunities together with the relevant time periods and multipliers being offered. The interface may enable the user to activate a reminder notification in advance of a selected time period when the user may wish to participate. Here, the surge pricing module 242 may present the opportunities in a ranked list that may be customized to the user based on inferred likelihoods of the user accepting the opportunity and/or enabling a notification. Example embodiments of a user interface facilitated by the surge pricing module 242 are illustrated in FIGS. 5-6 below. Processes associated with generating the ranked list are further described below with respect to FIGS. 7-8.

Figure 3:
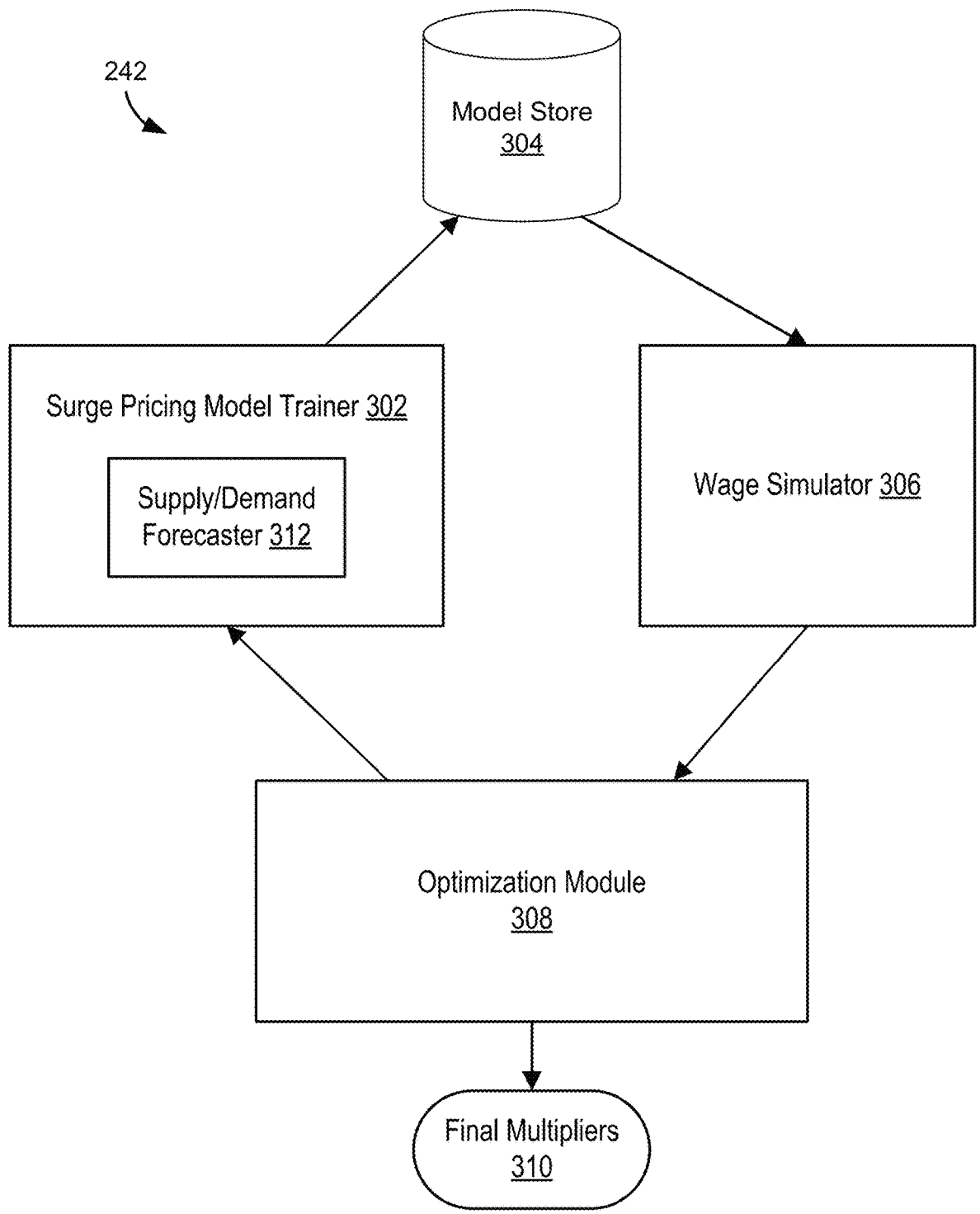
FIG. 3 is a block diagram illustrating an example embodiment of an architecture for a surge pricing module in an online concierge system.

FIG. 3 illustrates an example architecture for a surge pricing module 242. In this example, the surge pricing module 242 includes a surge pricing model trainer 302 (which includes a supply/demand forecaster 312), a model store 304 for a set of candidate surge pricing models, a wage simulator 306, and an optimization module 308. In alternative embodiments, the surge pricing module 242 may include additional or different components.

The surge pricing model trainer 302 trains candidate surge pricing models and stores them to the model store 304. The surge pricing model trainer 302 includes a supply/demand forecaster 312 that infers a ratio between supply and demand for pickers over a series of future time periods. In an example embodiment, the supply/demand forecaster 312 may include separate supply and demand models that forecast supply and demand respectively for each of a series of future time periods. The supply and demand models may comprise machine learning models trained to forecast supply and demand respectively based on historical data and various input conditions such as time of day, day of the week, time of year, temporal proximity to a holiday, geographic location, weather, product availability, or various other factors. Alternatively, the supply and demand models may compute forecasted supply and demand based on various heuristic algorithms (that may relate to historical observations) that do not necessarily require machine learning techniques.

Based on the supply/demand forecasts, cost data, and other factors, the surge pricing model trainer 302 generates a surge pricing model that specifies a multiplier for each of the series of time periods. In an initial iteration, the surge pricing model trainer 302 may generate initial multipliers based on various rules or heuristics applied to the supply/demand forecasts and cost data. For example, the initial multipliers may be computed as a linear function that sets multipliers for each time period while keeping overall budget across the series of time periods substantially cost neutral. Generally, the function may operate to output multipliers that are relatively higher during periods of relatively higher forecasted demand relative to supply, and that are relatively lower during periods of relatively lower forecasted demand relative to supply while substantially maintaining the same overall budget as a non-dynamic pricing model (i.e., constant multiplier of 1). For example, if demand is forecasted to be relatively high on Sunday and relatively low on Wednesday, the initial multiplier generator may generate multipliers that are relatively higher on Sunday and lower on Wednesday. This technique encourages more participation on Sunday to meet peak demand, while reducing cost on lower demand days to meet budget constraints.

The specific function applied by the surge pricing model trainer 302 may be dependent on one or more hyperparameters that affect the relationship between the supply/demand forecasts and the generated multipliers. After determining the initial multipliers, the surge pricing model trainer 302 may subsequently generate different candidate surge pricing models based on different hyperparameters through an optimization process described further below. For example, a hyperparameter may comprise a scaling factor that affects changes in the multipliers between iterations.

The model store 304 stores one or more candidate surge pricing models generated by the surge pricing model trainer 302 over multiple optimization iterations. The surge pricing models may directly include values for the multipliers for each time period or may include other parameters from which the multipliers can be derived.

The wage simulator 306 applies a candidate surge pricing model (from the model store 304) to simulate wages paid to pickers over the series of future time periods and the overall budget effects of that pricing model. Here, the wage simulator 306 may leverage historical data describing various events of the online concierge system 140 (e.g., ordered received) and simulate the wages paid to pickers over the series of time periods when the candidate surge pricing model is applied to the series of events. The wage simulator 306 may characterize the performance of the candidate surge pricing model by one or more operational metrics that relates to overall costs incurred for the simulated time period. The operational metric may comprise, for example, an average cost per day over the time period, a cost variance, or other metric.

The optimization module 308 obtains the operational metric from the wage simulator 306 for a candidate surge pricing model and determines if the operational metric meets predefined optimization criterion. For example, the optimization module 308 may determine if the candidate surge pricing model sufficiently maintains budget neutrality (i.e., the operational metric falls within a predefined range). If the optimization criterion is met, the optimization module 308 outputs the final multipliers 310 that achieve the optimization criterion.

Otherwise, if the optimization criterion is not met, the optimization module 308 updates the one or more hyperparameters used by the surge pricing model trainer 302 to generate the candidate models. Here, the optimization module 308 may adjust the one or more hyperparameters in a manner that is expected to bring the operational metric closer to meeting the optimization criterion over a set of iterations. For example, in one or more embodiments, the optimization module may apply a binary search algorithm that iteratively adjusts the one or more hyperparameters over multiple iterations. In other embodiments, different optimization techniques, such as gradient optimization, may be used.

The surge pricing module 242 may operate iteratively as described above until the optimization criterion is met. For example, in each iteration, the surge pricing model trainer 302 may generate a candidate surge pricing model based on one or more hyperparameters, the wage simulator 306 simulates wages over the series of time periods using the candidate surge pricing model to generate an updated operational metric, and the optimization module 308 evaluates the operational metric against an optimization criterion, and updates the hyperparameters dependent on the evaluation.

In further embodiments, the wage simulator 306 may include a model for inferring changes in picker participation based on the surge pricing model. For example, the wage simulator 306 may infer that more pickers will participate when the multiplier is higher and fewer pickers will participate when the multiplier is lower. Furthermore, in some embodiments, the wage simulator 306 may utilize real-time information from the picker client devices 110 to infer participation levels. For example, the wage simulator 306 may obtain information about notification reminders that have been set by users in association with picker opportunities during certain time windows, and use this information to infer picker levels for those time windows. These inferences may be factored into the wage simulation to further optimize the final multipliers 310.

Figure 4:
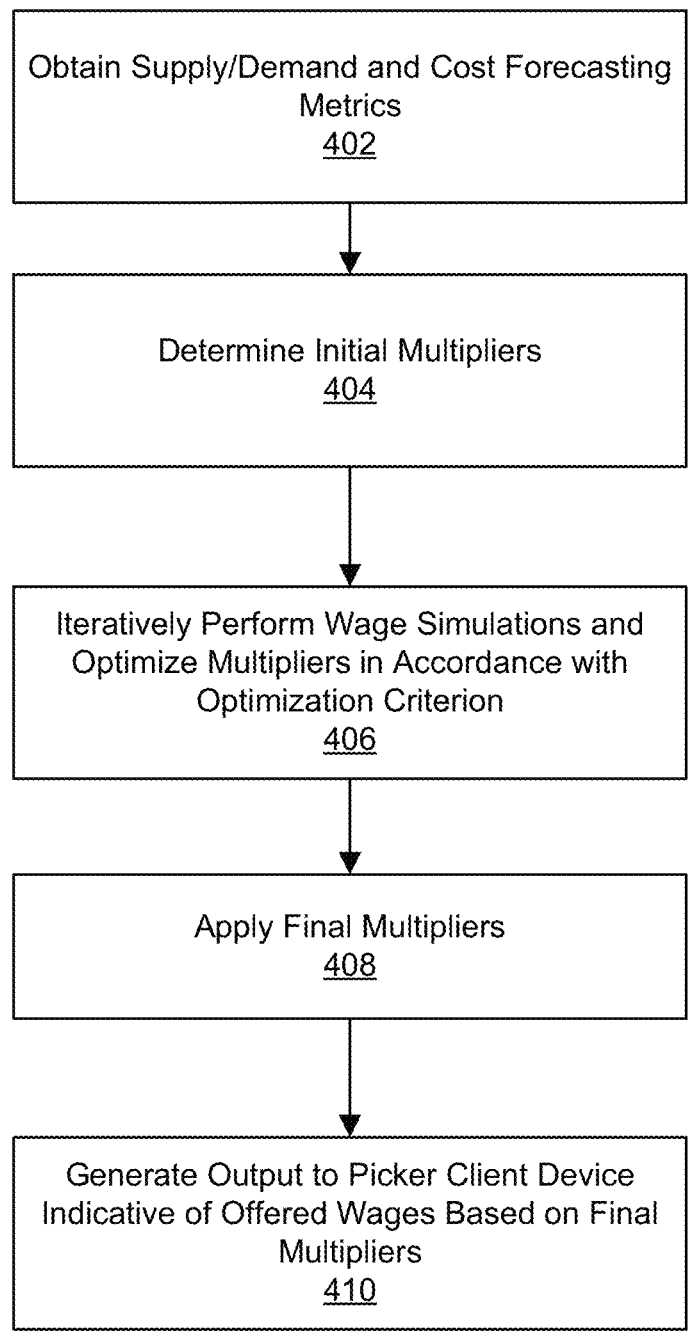
FIG. 4 is a flowchart illustrating an example embodiment of a process for facilitating surge pricing in an online concierge system.

FIG. 4 is a flowchart illustrating a process for facilitating surge pricing in an online concierge system, in accordance with some embodiments. Alternative embodiments may include more, fewer, or different steps, and the steps may be performed in a different order from those illustrated. These steps may be performed by an online concierge system (e.g., online concierge system 140 without necessarily involving human intervention.

The online concierge system obtains 402 forecasted supply and demand metrics and cost metrics for a series of future time periods The supply and demand metrics may comprise, for example, ratios between forecasted supply and demand in each of the series of future time periods. The cost metrics may comprise, for example, expected base wages per picker during each of the series of future time periods.

The online concierge system 140 determines 404 respective initial multipliers for applying to the respective base wages in the series of future time periods based on the supply and demand metrics and the cost metrics.

The online concierge system iteratively performs 406 wage simulations associated with operation of the online concierge system 140 over the series of future time periods and optimizes the multipliers. Here, the online concierge system may initially perform the simulation using the initial multipliers and then iteratively update the current multipliers in each iteration until an optimization criterion is met.

Upon meeting the optimization criterion, the online concierge system applies 408 the respective final multipliers to the respective base wages for the series of future time periods to generate respective optimized wages for the series of future time periods.

The online concierge system then outputs 410, via the picker client device 110, an indication of the optimized wages for each of the series of time periods. Available pickers may view the optimized wages being offered and decide to participate in the online concierge system (e.g., accept order assignments) in exchange for the offered wages and/or set reminders to be notified in advance of selected time periods.

In one or more embodiments, the online concierge system 140 may periodically update the multipliers being offered for future time periods as supply and demand forecasts change and as new historical data is obtained. Furthermore, the online concierge system 140 may separately execute the above-described process for different geographic regions to determine region-specific multipliers for each time period to be used in that region dependent on forecasting models and historical data that may be specific to that region.

FIGS. 5-6 illustrate example user interfaces for a picker application of a picker client device 110 associated with alerting pickers to surge pricing opportunities. In the example of FIG. 5, an interface 500 shows a list 502 of upcoming surge pricing opportunities where the picker can receive enhanced wages. In this example, each entry in the list 502 specifies the date, time window, and multiplier being offered. In this example, the multiplier is specified as a percentage above the base wage (e.g., +10%, +20%, etc.) Each entry in the list 502 also includes a toggle switch 504 that enables the user to turn a reminder notification on or off. When activated, the picker client device 110 may generate an alert (e.g., as a push notification, text message, email, phone call, or other notification mechanism) in advance of the time window to remind the user of the surge pricing being offered. The interface 500 may furthermore include a "show more" button 506 that enables the user to view additional time windows where surge pricing is offered.

The surge pricing opportunities in the list 502 may be ranked based on various ranking algorithms. In one or more embodiments, the list 502 may be ranked chronologically. In some embodiments, the chronological list may be filtered to include only opportunities with at least a threshold multiplier. Alternatively, the list 502 may be ranked based on the multiplier being offered from highest to lowest. This ranking may furthermore be limited to time windows within some time threshold (e.g., the highest multipliers within the next two weeks). In these embodiments, the time window and/or multiplier thresholds for filtering results may be manually set by the user or may be automatically determined.

In some embodiments, a machine learning process may be employed to rank surge pricing opportunities based on inferred likelihoods of the opportunities being selected by users. For example, a machine learning model may be trained based on historical data that correlates user profiles with surge pricing opportunities they accept. The historical data may be specific to the individual user or may be based on a population of similarly situated users. In some embodiments, the model may obtain various external data as inputs, such as the user's calendar entries or other information indicative of availability. Furthermore, in some embodiments, the user's actions with respect to enabling notification may be utilized to rank the results even if the user does not ultimately participate in those opportunities.

FIG. 6 illustrates another embodiment of a user interface 600 for a picker client device 110. In this example interface, the entries in the list 602 of opportunities are displayed using a bar graph or other set of visual elements that visually indicate the relative wages being offered to pickers in different time windows. The visual representation may furthermore show the offered wages relative to an average (e.g., base wage) and/or may expressly indicate the multiplier (e.g., as a percentage above the base wage). The interface 600 may furthermore include a control element 604 for switching between a daily view and a weekly view. Here, the daily view may show the wage variance for smaller time periods (e.g., a few hours), while the weekly view may show average pay opportunities for the day (which may span several time periods having different multipliers).

Figure 7:
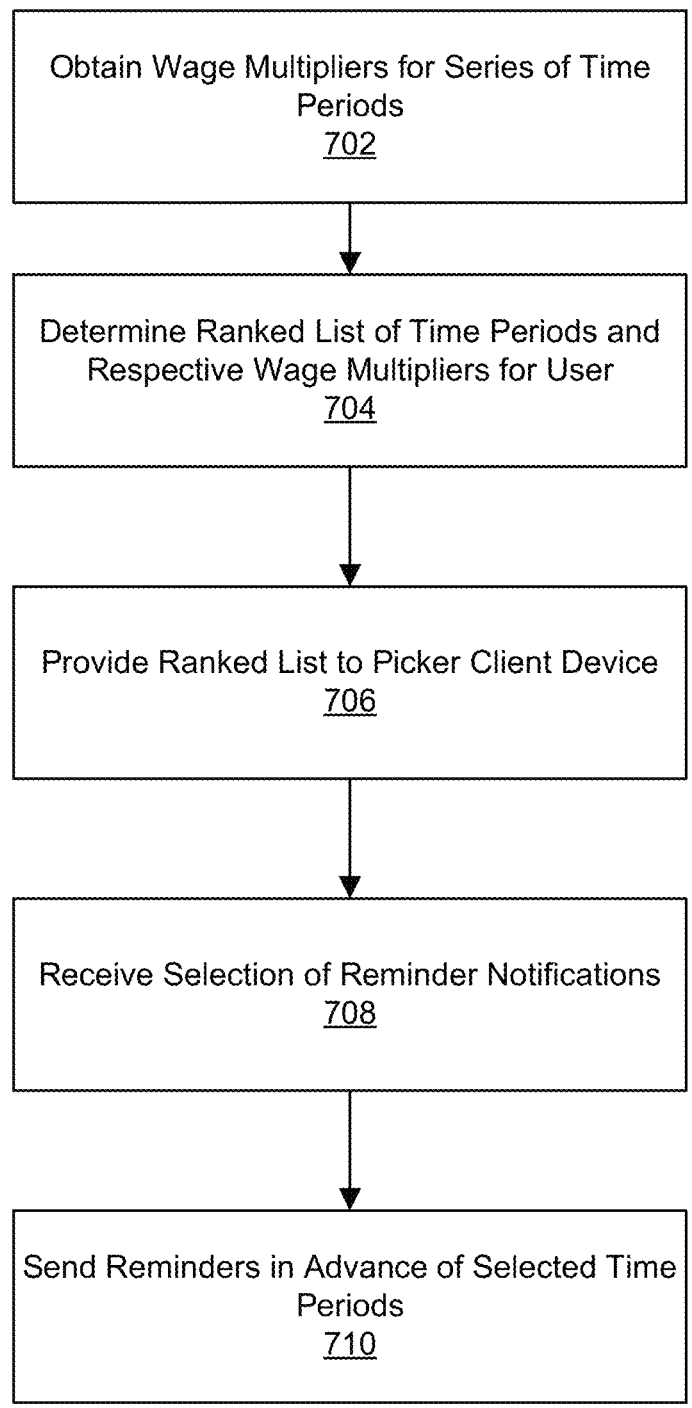
FIG. 7 is a flowchart illustrating an example embodiment of a process for presenting a user interface indicative of surge pricing opportunities in a picker client device of an online concierge system.

FIG. 7 illustrates an example embodiment of a process for generating a ranked list of time windows for a user associated with opportunities to participate as a picker. The online concierge system 140 obtains 702, for a series of future time periods, respective wage multipliers for offering to pickers of an online concierge system 140 (e.g., using the techniques described above). The online concierge system 140 determines 704, for an individual user, a list of ranked time periods and the respective wage multipliers for the ranked time periods. The ranked list may be generated using a machine learning model applied to user profile data. Here, the machine learning model may be trained in a machine learning process to infer respective likelihoods of the user accepting the different opportunities. The online concierge system 140 provides 706 the ranked list of opportunities to a picker client device 110 for presenting in a user interface. The user may then select to turn on notifications relating to various opportunities. The picker client device 110 receives 708 selections of reminder notifications and sends 710 reminders in advance of the selected time periods. The user may then choose whether or not to accept a picker opportunity for the offered wage.

Figure 8:
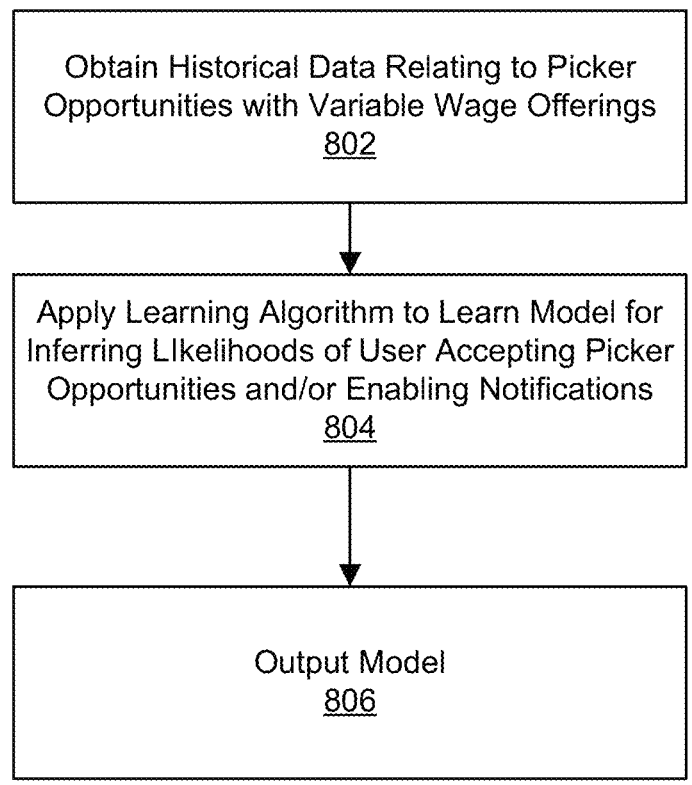
FIG. 8 is a flowchart illustrating an example embodiment of a process for training a model to rank a list of picker opportunities for a user of the online concierge system.

FIG. 8 is a flowchart illustrating an example embodiment of a process for training a machine learning model for ranking picker opportunities in association with an online concierge system 140 operating with a surge pricing model. The online concierge system 140 obtains 802 historical data. The historical data may be user specific or may relate to a population of users. The historical data may include various event data indicating historical picker opportunities that have been accepted by a user together with the relevant time period and wage multiplier offered. The historical data may furthermore be indicative of opportunities that were presented to the user and were declined. Additionally, or alternatively, the historical data may include information indicating opportunities where the user enabled reminder notifications, or were presented with reminder notifications that the user chose not to enable. The historical data may furthermore include various profile characteristics of the user or various external data.

The online concierge system 140 may apply 804 a supervised learning algorithm that learns likelihoods of the user accepting participation opportunities and/or enabling notifications for participation opportunities. Here, the inputs may comprise feature vectors representing user characteristics and/or situational characteristics associated with different opportunities and the labels may indicate whether or not they were accepted. Any of the machine learning techniques described above in relation to the machine learning training module 230 may be employed to train the machine learning model. The online concierge system 140 then outputs 806 the trained model. Different models may be trained for different users or populations of users. Furthermore, the models may be updated in an online manner as additional data is obtained based on user interactions with the ranked lists.

ADDITIONAL CONSIDERATIONS

The foregoing description of the embodiments has been presented for the purpose of illustration; many modifications and variations are possible while remaining within the principles and teachings of the above description. Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include any computer program product or other data combination described herein.

The description herein may describe processes and systems that use machine learning models in the performance of their described functionalities. A "machine learning model," as used herein, comprises one or more machine learning models that perform the described functionality. Machine learning models may be stored on one or more computer-readable media with a set of weights. These weights are parameters used by the machine learning model to transform input data received by the model into output data. The weights may be generated through a training process, whereby the machine learning model is trained based on a set of training examples and labels associated with the training examples. The training process may include applying the machine learning model to a training example, comparing an output of the machine learning model to the label associated with the training example, and updating weights associated for the machine learning model through a back-propagation process. The weights may be stored on one or more computer-readable media, and are used by a system when applying the machine learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method comprising, at a computer system comprising a processor and a computer-readable medium:
   obtaining a respective wage multiplier for each of a set of time windows, wherein a respective wage multiplier is an offering to pickers of an online system for fulfilling orders for items placed by users using client devices;
   computing a user selection score for each time window in the set of time windows, wherein a user selection score is a score representing a predicted likelihood that a user will select a time window based on the respective wage multiplier, wherein the user selection scores are computed by applying a machine-learning model to user profile data associated with the user, wherein the machine-learning model is trained according to a learning process comprising:
      obtaining historical data associated with participation of the user in the online system including time windows where the user was available for fulfilling orders for the online system and wage multipliers applied when the user was available for fulfilling orders, and
      applying a supervised learning algorithm to the historical data to learn the respective likelihoods;
   determining a ranked list of the set of time windows and the respective wage multipliers for the time windows based on the computed user selection scores for each of the time windows;
   providing the ranked list of time windows to a picker client device for presenting in a user interface;
   receiving a selection from the picker through the picker client device of a time window of the set of time windows;
   transmitting, at the time window selected by the picker, instructions to the picker client device to display a notification to the picker describing the selected time window and the respective wage multiplier;
   receiving an indication from the picker client device that the picker is available for fulfilling orders for the online system;
   responsive to receiving the indication from the picker client device, retraining the machine-learning model based on the indication;
   obtaining a respective wage multiplier for each of another set of time windows;
   computing a user selection score for each time window in the other set of time windows, wherein the user selection score for each of the other set of time windows is computed by applying the retrained machine-learning model;
   determining a ranked list of the other set of time windows and the respective wage multipliers based on the computed user selection scores for the other set of time windows; and
   providing the ranked list of the other set of time windows to another picker client device for presenting in a user interface.

2. The method of claim 1, further comprising:
   making the picker associated with the picker client device available for assignment to orders by the online system during the selected time window.

3. The method of claim 1, wherein the user interface comprises:
   a notification selection element for switching on or off a notification associated with a time window in the ranked list of time windows; and
   responsive to the notification selection element being activated for a selected time window, generating a notification to the picker client device at a predefined time in advance of the selected time window.

4. The method of claim 1, wherein the user interface comprises:
   a set of visual indicators for each of the ranked list of time windows representing the respective wage multipliers for each of the ranked list of time windows.

5. The method of claim 1, wherein the historical data further includes events associated with a population of users of the online system and profile characteristics associated with the population of users.

6. The method of claim 1, wherein the historical data further identifies selections by the user to enable notifications in advance of one or more of the time windows.

7. A non-transitory computer-readable storage medium storing instructions executable by one or more processors for performing steps including:
   obtaining a respective wage multiplier for each of a set of time windows, wherein a respective wage multiplier is an offering to pickers of an online system for fulfilling orders for items placed by users using client devices;
   computing a user selection score for each time window in the set of time windows, wherein a user selection score is a score representing a predicted likelihood that a user will select a time window based on the respective wage multiplier, wherein the user selection scores are computed by applying a machine-learning model to user profile data associated with the user, wherein the machine-learning model is trained according to a learning process comprising:
      obtaining historical data associated with participation of the user in the online system including time windows where the user was available for fulfilling orders for the online system and wage multipliers applied when the user was available for fulfilling orders, and
      applying a supervised learning algorithm to the historical data to learn the respective likelihoods;
   determining a ranked list of the set of time windows and the respective wage multipliers for the time windows based on the computed user selection scores for each of the time windows;
   providing the ranked list of time windows to a picker client device for presenting in a user interface;
   receiving a selection from the picker through the picker client device of a time window of the set of time windows;
   transmitting, at the time window selected by the picker, instructions to the picker client device to display a notification to the picker describing the selected time window and the respective wage multiplier;
   receiving an indication from the picker client device that the picker is available for fulfilling orders for the online system;
   responsive to receiving the indication from the picker client device, retraining the machine-learning model based on the indication;
   obtaining a respective wage multiplier for each of another set of time windows;
   computing a user selection score for each time window in the other set of time windows, wherein the user selection score for each of the other set of time windows is computed by applying the retrained machine-learning model;

determining a ranked list of the other set of time windows and the respective wage multipliers based on the computed user selection scores for the other set of time windows; and providing the ranked list of the other set of time windows to another picker client device for presenting in a user interface.

8. The non-transitory computer-readable storage medium of claim 7, wherein the steps further comprise:
making the picker associated with the picker client device available for assignment to orders by the online system during the selected time window.

9. The non-transitory computer-readable storage medium of claim 7, wherein the user interface comprises:
a notification selection element for switching on or off a notification associated with a time window in the ranked list of time windows; and
responsive to the notification selection element being activated for a selected time window, generating a notification to the picker client device at a predefined time in advance of the selected time window.

10. The non-transitory computer-readable storage medium of claim 7, wherein the user interface comprises:
a set of visual indicators for each of the ranked list of time windows representing respective wage multipliers for each of the ranked list of time windows.

11. The non-transitory computer-readable storage medium of claim 7, wherein the historical data further includes events associated with a population of users of the online system and profile characteristics associated with the population of users.

12. The non-transitory computer-readable storage medium of claim 7, wherein the historical data further identifies selections by the user to enable notifications in advance of one or more of the time windows.

13. A computer system comprising:
one or more processors; and
a non-transitory computer-readable storage medium storing instructions executable by the one or more processors for performing steps including:
obtaining a respective wage multiplier for each of a set of time windows, wherein a respective wage multiplier is an offering to pickers of an online system for fulfilling orders for items placed by users using client devices;
computing a user selection score for each time window in the set of time windows, wherein a user selection score is a score representing a predicted likelihood that a user will select a time window based on the respective wage multiplier, wherein the user selection scores are computed by applying a machine-learning model to user profile data associated with the user, wherein the machine-learning model is trained according to a learning process comprising:
obtaining historical data associated with participation of the user in the online system including time windows where the user was available for fulfilling orders for the online system and wage multipliers applied when the user was available for fulfilling orders, and
applying a supervised learning algorithm to the historical data to learn the respective likelihoods;

determining a ranked list of the set of time windows and the respective wage multipliers for the time windows based on the computed user selection scores for each of the time windows;
providing the ranked list of time windows to a picker client device for presenting in a user interface;
receiving a selection from the picker through the picker client device of a time window of the set of time windows;
transmitting, at the time window selected by the picker, instructions to the picker client device to display a notification to the picker describing the selected time window and the respective wage multiplier;
receiving an indication from the picker client device that the picker is available for fulfilling orders for the online system;
responsive to receiving the indication from the picker client device, retraining the machine-learning model based on the indication;
obtaining a respective wage multiplier for each of another set of time windows;
computing a user selection score for each time window in the other set of time windows, wherein the user selection score for each of the other set of time windows is computed by applying the retrained machine-learning model;
determining a ranked list of the other set of time windows and the respective wage multipliers based on the computed user selection scores for the other set of time windows; and
providing the ranked list of the other set of time windows to another picker client device for presenting in a user interface.

14. The computer system of claim 13, wherein the steps further comprise:
making the picker associated with the picker client device available for assignment to orders by the online system during the selected time window.

15. The computer system of claim 13, wherein the user interface comprises:
a notification selection element for switching on or off a notification associated with a time window in the ranked list of time windows; and
responsive to the notification selection element being activated for a selected time window, generating a notification to the picker client device at a predefined time in advance of the selected time window.

16. The computer system of claim 13, wherein the user interface comprises:
a set of visual indicators for each of the ranked list of time windows representing respective wage multipliers for each of the ranked list of time windows.

17. The computer system of claim 13, wherein the historical data further includes events associated with a population of users of the online concierge system and profile characteristics associated with the population of users.

18. The computer system of claim 13, wherein the historical data further identifies selections by the user to enable notifications in advance of one or more of the time windows.

* * * * *